US012621231B2

(12) United States Patent　　　　　　(10) Patent No.:　US 12,621,231 B2

Subramanya et al.　　　　　　　　　　(45) Date of Patent:　　　May 5, 2026

(54) PROVIDING CONFIDENCE THRESHOLDS IN AN ANALYTICS REQUEST OR SUBSCRIPTION

(71) Applicant: NOKIA TECHNOLOGIES OY, Espoo (FI)

(72) Inventors: Tejas Subramanya, Munich (DE); Janne Tapio Ali-Tolppa, Taufkirchen (DE); Márton Kajó, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 311 days.

(21) Appl. No.: 18/273,822

(22) PCT Filed: Feb. 15, 2021

(86) PCT No.: PCT/EP2021/053615

§ 371 (c)(1),
(2) Date: Jul. 24, 2023

(87) PCT Pub. No.: WO2022/171306

PCT Pub. Date: Aug. 18, 2022

(65) Prior Publication Data

US 2024/0214293 A1　　Jun. 27, 2024

(51) Int. Cl.
*H04L 43/16*　　　　(2022.01)
*H04L 41/5019*　　　(2022.01)

(52) U.S. Cl.
CPC .......... *H04L 43/16* (2013.01); *H04L 41/5019* (2013.01)

(58) Field of Classification Search
CPC ..... H04L 43/16; H04L 41/5019; H04L 65/80; H04W 24/04
See application file for complete search history.

(56) References Cited

U.S. PATENT DOCUMENTS

2020/0112907 A1　　4/2020　Dao et al.
2020/0358670 A1 * 11/2020　Lee ....................... H04L 43/028

FOREIGN PATENT DOCUMENTS

WO　　WO-2022033821 A1 *　2/2022　............ H04W 24/10

OTHER PUBLICATIONS

Office Action received for corresponding European Patent Application No. 21706508.5, dated Feb. 14, 2025, 8 pages.

(Continued)

*Primary Examiner* — Noel R Beharry
(74) *Attorney, Agent, or Firm* — Carter, DeLuca & Farrell LLP

(57)　　　　　　ABSTRACT

Certain example embodiments provide systems, methods, apparatuses, and computer program products for providing confidence thresholds in an analytics request or subscription. For example, certain embodiments may include a confidence threshold for each reporting threshold (e.g., quality of service (QoS) metric-specific reporting threshold) in an analytics request or subscription (e.g., a network data analytics function (NWDAF) QoS sustainability analytics request or subscription). The confidence threshold (lower bound) can be determined by the consumer application based on their individual needs, e.g., based on the cost or impact of the compensating actions on the predicted QoS sustainability notification. The confidence threshold, in combination with the reporting threshold, may define the conditions for analytics events and/or notifications (e.g., QoS sustainability prediction analytics events and the related notifications).

1 Claim, 8 Drawing Sheets

(56) References Cited

OTHER PUBLICATIONS

International Search Report and Written Opinion dated Nov. 9, 2021 corresponding to International Patent Application No. PCT/EP2021/053615.

3GPP TS 23.288 V16.2.0 (Dec. 2019), Technical Specification, 3rd Generation Partnership Project; Technical Specification Group Services and System Aspects; Architecture enhancements for 5G System (5GS) to support network data analytics services (Release 16), Dec. 17, 2019, XP051867056.

Nokia et al., "NWDAF/NEF service for QoS prediction notification," 3GPP Draft; S2-1903766, SA WG2 Temporary Document, SA WG2 Meeting #132, Apr. 8-12, 2019, Xi'an, China, Apr. 2, 2019, XP051719905.

3GPP TS 23.288 V16.6.0 (Dec. 2020), Technical Specification, 3rd Generation Partnership Project; Technical Specification Group Services and System Aspects; Architecture enhancements for 5G System (5GS) to support hetwork data analytics services (Release 16), Dec. 2020.

3GPP TS 23.502 V16.7.1 (Jan. 2021), Technical Specification, 3rd Generation Partnership Project; Technical Specification Group Services and System Aspects; Procedures for the 5G System (5GS); Stage 2 (Release 16), Jan. 2021.

3GPP TR 23.700-91 V17.0.0 (Dec. 2020), Technical Specification, 3rd Generation Partnership Project; Technical Specification Group Services and System Aspects; Study on enablers for network automation for the 5G System (5GS); Phase 2 (Release 17), Dec. 2020.

3GPP TS 28.554 V17.1.1 (Dec. 2020), Technical Specification, 3rd Generation Partnership Project; Technical Specification Group Services and System Aspects; Management and orchestration; 5G end to end Key Performance Indicators (KPI) (Release 17), Dec. 2020.

3GPP TS 29.520 V16.4.0 (Jun. 2020), Technical Specification, 3rd Generation Partnership Project; Technical Specification Group Core Network and Terminals; 5G System; Network Data Analytics Services; Stage 3 (Release 16), Jun. 2020.

"Corrections for maximum No. of objects and Maximum No. of SUPIs", SA WG2 Meeting #139E, S2-2003668, Nokia, Jun. 1-12, 2020, 19 pages.

"3rd Generation Partnership Project; Technical Specification Group Services and System Aspects; Management and orchestration; Artificial Intelligence / Machine Learning (AI/ML management (Release 17)", 3GPP TS 28.105, V17.3.0, Mar. 2023, pp. 1-34.

Office action received for corresponding European Patent Application No. 21706508.5, dated Jun. 26, 2024, 8 pages.

* cited by examiner

400

602 — Transmit an analytics request or subscription

604 — Receive an analytics response or notification based on the combination of the confidence threshold and the reporting threshold

600

702 —— Receive an analytics request or subscription

704 —— Transmit, to an analytics consumer, an analytics response or notification based on the combination of the confidence threshold and the reporting threshold

700

PROVIDING CONFIDENCE THRESHOLDS IN AN ANALYTICS REQUEST OR SUBSCRIPTION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for providing confidence thresholds in an analytics request or subscription.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method may include transmitting, by an analytics consumer, an analytics request or subscription. The analytics request or subscription may include one or more confidence thresholds corresponding to one or more reporting thresholds. A combination of a confidence threshold and a reporting threshold may define a condition for a prediction analytics event or a notification. The method may include receiving an analytics response or notification based on the combination of the confidence threshold and the reporting threshold.

In a variant, the analytics request or subscription may include a quality of service sustainability analytics request or subscription. In a variant, the quality of service sustainability analytics request or subscription may be associated with radio access network user equipment throughput-based analytics for non-guaranteed bitrate quality of service flows or with quality of service flow retainability-based analytics for guaranteed bitrate quality of service flows. In a variant, the confidence threshold may include a lower bound confidence threshold and the reporting threshold may include a higher bound reporting threshold. In a variant, the confidence threshold may include a lower bound confidence threshold and the reporting threshold may include a lower bound reporting threshold. In a variant, the confidence threshold may include a lower bound confidence threshold and the reporting threshold may include a range within which one or more metrics are expected to remain.

According to a second embodiment, a method may include receiving, by a network data analytics function, an analytics request or subscription. The analytics request or subscription may include one or more confidence thresholds corresponding to one or more reporting thresholds. A combination of a confidence threshold and a reporting threshold may define a condition for a prediction analytics event or a notification. The method may include transmitting, to an analytics consumer, an analytics response or notification based on the combination of the confidence threshold and the reporting threshold.

In a variant, the analytics request or subscription may include a quality of service sustainability analytics request or subscription. In a variant, the quality of service sustainability analytics request or subscription may be associated with radio access network user equipment throughput-based analytics for non-guaranteed bitrate quality of service flows or with quality of service flow retainability-based analytics for guaranteed bitrate quality of service flows. In a variant, the confidence threshold may include a lower bound confidence threshold and the reporting threshold may include a higher bound reporting threshold. In a variant, the confidence threshold may include a lower bound confidence threshold and the reporting threshold may include a lower bound reporting threshold. In a variant, the confidence threshold may include a lower bound threshold and the reporting threshold may include a range within which one or more metrics are expected to remain.

A third embodiment may be directed to an apparatus including at least one processor and at least one memory comprising computer program code. The at least one memory and computer program code may be configured, with the at least one processor, to cause the apparatus at least to perform the method according to the first embodiment or the second embodiment, or any of the variants discussed above.

A fourth embodiment may be directed to an apparatus that may include circuitry configured to cause the apparatus to perform the method according to the first embodiment or the second embodiment, or any of the variants discussed above.

A fifth embodiment may be directed to an apparatus that may include means for performing the method according to the first embodiment or the second embodiment, or any of the variants discussed above. Examples of the means may include one or more processors, memory, and/or computer program codes for causing the performance of the operation.

A sixth embodiment may be directed to a computer readable medium comprising program instructions stored thereon for causing an apparatus to perform at least the method according to the first embodiment or the second embodiment, or any of the variants discussed above.

A seventh embodiment may be directed to a computer program product encoding instructions for causing an apparatus to perform at least the method according to the first embodiment or the second embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
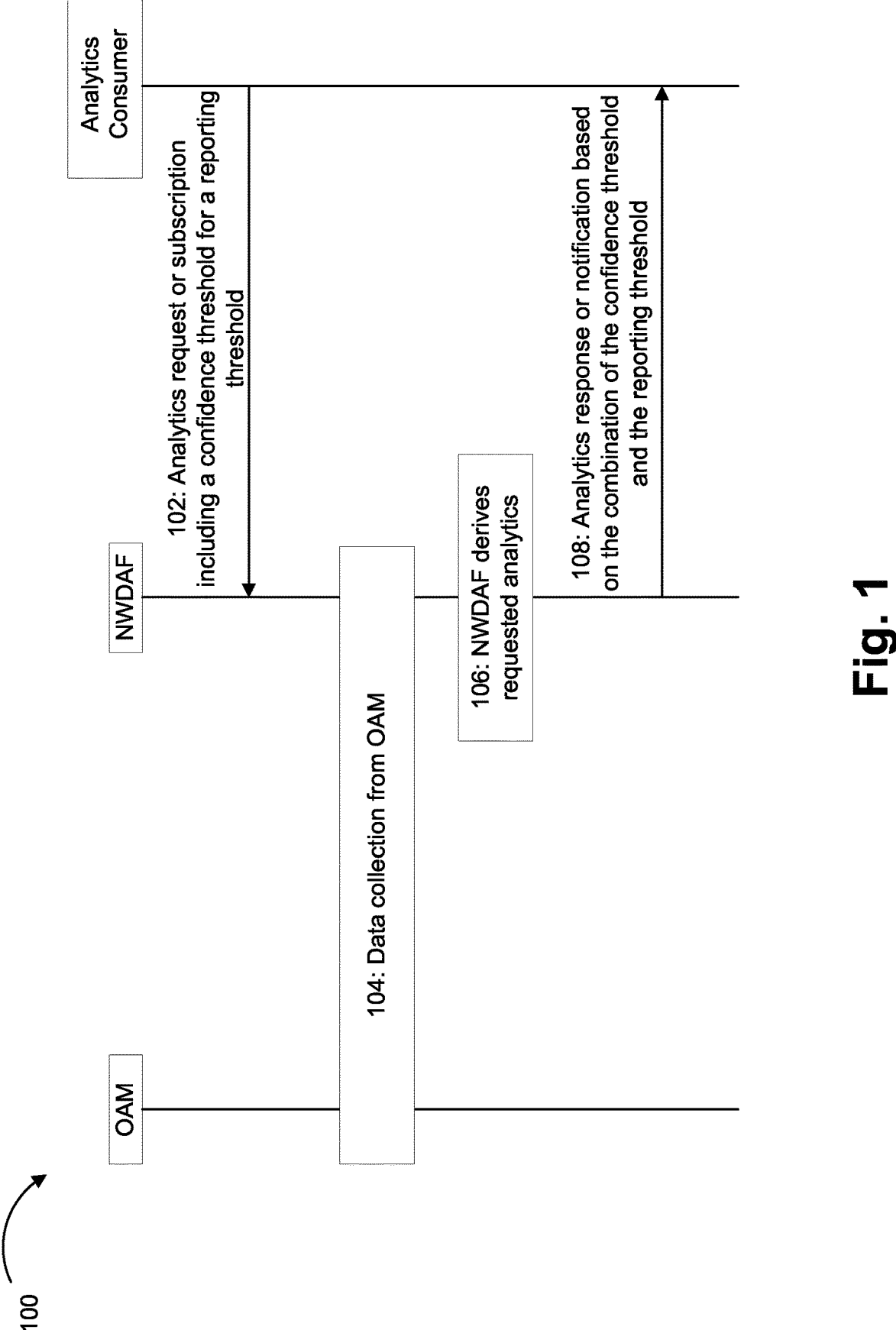
FIG. 1 illustrates an example signal diagram for providing confidence thresholds in an analytics request or subscription, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing confidence thresholds in an analytics request or subscription is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Quality of Service (QoS) sustainability analytics may be part of NR and may enable monitoring, analyzing, or predicting the QoS of a 5G System (5GS). The consumer (e.g., an application function (AF)) may subscribe to QoS sustainability (prediction) notifications to consume those analytics. For instance, an autonomous guided vehicle (AGV), e.g., transporting goods in a smart factory, may respond to such (predicted) QoS notifications by switching from normal operation mode to an adapted mode (e.g., that includes slowing speed or re-routing) or to a safe mode (e.g., that includes parking in a proper location). Alternatively, in a case where the AGV is using video image-based simultaneous localization and mapping (SLAM) methods for positioning and/or is offloading part of the algorithm's computation to an edge cloud, it can change the offloading decisions based on the (predicted) QoS notifications. If high QoS can be guaranteed, the AGV may offload more of the SLAM computation to the edge cloud to save local resources for other use or for energy saving, whereas if QoS is (predicted to be) lower, more of the algorithm may be executed locally in the device to reduce the communications. The transition between normal and adapted and/or safe modes, as well as the changing of edge cloud offloading configuration, may not be instantaneous, and QoS prediction can be used to provide an early warning, thereby giving enough time for the AGV to prepare.

In NR, the consumer of QoS sustainability analytics may request, from the network data analytics function (NWDAF), analytics information regarding the QoS change statistics for an analytics target period in the past in a certain area, or the likelihood of a QoS change for an analytics target period in the future in a certain area. The consumer can subscribe either to notifications (e.g., a subscribe-notify model) or a single notification (e.g., a request-response model).

Certain scenarios may involve a consumer subscribing to NWDAF QoS sustainability analytics to receive notifications regarding the QoS change statistics and/or predictions. To avoid unnecessary notifications, the consumer may set reporting thresholds for each QoS metric (e.g., performance indicator) in the subscription request. If the NWDAF determines that one of the reporting thresholds will be exceeded, an NWDAF QoS sustainability notification may be sent to the consumer.

In the case of a QoS sustainability prediction, the NWDAF may also include a confidence value of the prediction in the QoS sustainability notification sent to the consumer. However, a QoS sustainability notification may be sent whenever a QoS metric is predicted to exceed the corresponding reporting threshold, with any (or undetermined) confidence. For example, in the case of radio access network (RAN) UE throughput prediction versus confidence level, the NWDAF may predict that the throughput will be below a threshold T1 with a confidence C1. Some predictive systems may operate by giving a prediction for a certain confidence value, or giving a confidence value for a certain threshold. By allowing both to be set by the NWDAF, depending on the implementation, the NWDAF may erroneously predict too frequently that thresholds will be overstepped, often with such a low confidence that it is not useful for the consumer, or may erroneously predict too infrequently that thresholds will be overstepped because it is aiming for a confidence level that is beyond what is needed and misses early warnings that would have been needed by the consumer.

The confidence level may depend on the consumer application. For instance, the confidence level may depend on the cost or impact of the compensating actions exercised by the consumer application based on the predicted QoS sustainability notification. For example, when the cost of the action versus the impact of not taking the action is low, a low confidence level may be used to maximize detections (e.g., adapting video stream quality for a category subscriber to prevent buffering). As another example, when the cost of the action versus the impact of not taking the action is high, a high confidence level may be used to minimize false positives (e.g., re-routing an AGV). The consumer of NWDAF QoS sustainability analytics, during the request and/or subscription, may have no way of specifying the confidence threshold for receiving notifications regarding the QoS sustainability predictions.

Some embodiments described herein may provide confidence thresholds in an analytics request or subscription. For example, certain embodiments may include a confidence threshold for each reporting threshold (e.g., QoS metric-specific reporting threshold) in an analytics request or subscription (e.g., a NWDAF QoS sustainability analytics request or subscription). According to some embodiments, the confidence threshold (lower bound) can be determined by the consumer application based on their individual needs, e.g., based on the cost or impact of the compensating actions on the predicted QoS sustainability notification. In an embodiment, the confidence threshold, in combination with the reporting threshold, may define the conditions for analytics events and/or notifications (e.g., QoS sustainability prediction analytics events and the related notifications).

In this way, certain embodiments may improve at least the prediction behavior and notification criteria. For example, because confidence thresholds may be provided for each reporting threshold, an NWDAF may notify a consumer just when the reporting threshold prediction meets the confidence threshold, rather than anytime the reporting threshold is satisfied. This provides an additional condition for prediction behavior or notification criteria that reduces or eliminates inaccuracies that might occur with behavior or notifications that are based just on a reporting threshold. This may conserve processing resources that would otherwise be consumed performing behaviors or providing notifications that would not otherwise satisfy a confidence threshold.

FIG. 1 illustrates an example signal diagram 100 for providing confidence thresholds in an analytics request or subscription, according to some embodiments. As illustrated in FIG. 1, the example signal diagram 100 includes an operations, administration and management (OAM) function, a NWDAF, and an analytics consumer. As illustrated at 102, the analytics consumer may transmit, to the NWDAF, an analytics request or subscription including a confidence threshold for a reporting threshold for a metric (e.g., the metric may include RAN UE throughput, QoS flow retainability, etc.). For example, the analytics consumer may transmit a Nnwdaf_AnalyticsInfo_Request message or Nnwdaf_AnalyticsSubscription_Subscribe message, where the analytics identifier may indicate QoS sustainability. A combination of the confidence threshold and the reporting threshold may define a condition for a prediction analytics event or a notification. The reporting threshold may include, either implicitly or explicitly, a threshold condition including the direction of exceeding the threshold (e.g., whether the threshold is an upper bound or a lower bound). The direction of exceeding the threshold may be explicitly defined or implicitly defined, depending on the use case. For example, for data throughput, more throughput may be better.

As illustrated in the example of FIG. 1, at 104, the NWDAF may perform data collection from the OAM function. As illustrated at 106, the NWDAF may derive the requested analytics. As illustrated at 108, the NWDAF may transmit, to the analytics consumer, an analytics response or notification based on the combination of the confidence threshold and the reporting threshold. For example, the NWDAF may transmit a Nnwdaf_AnalyticsInfo_Response message or a Nnwdaf_AnalyticsSubscription_Notify message. The NWDAF may produce analytics for the requested or subscribed consumer, taking the required confidence threshold into account. A QoS sustainability prediction notification may be triggered when the defined reporting threshold for a particular QoS metric is predicted to be exceed with a confidence level equal to or higher than the defined confidence threshold for that specific reporting threshold. FIGS. 2-5 describe the relation between various QoS metrics, their reporting thresholds, and the corresponding confidence threshold (lower bound).

As described above, FIG. 1 is provided as an example. Other examples are possible, according to some embodiments.

Figure 2:
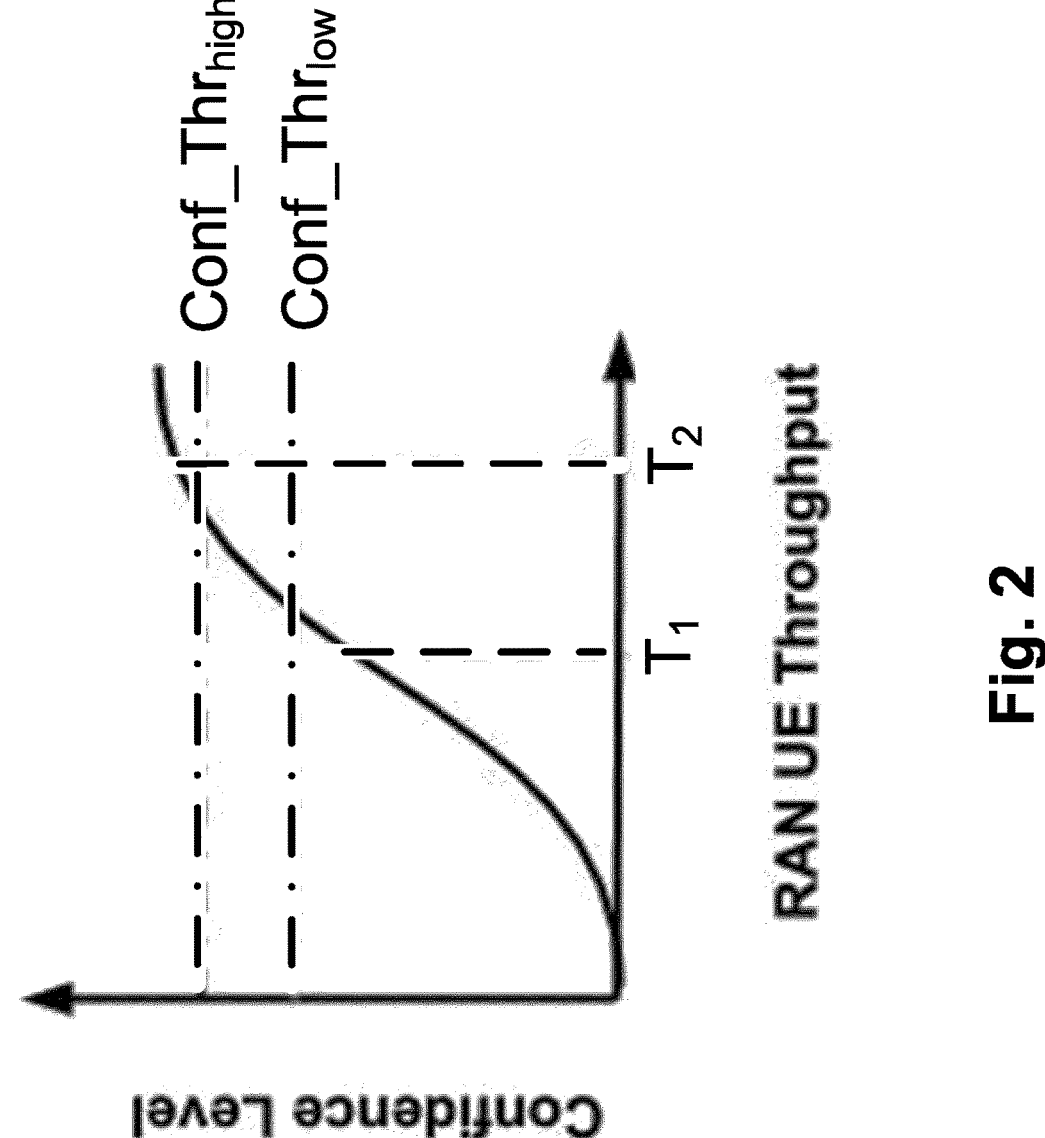
FIG. 2 illustrates an example of configuring a confidence threshold for a lower bound reporting threshold for radio access network (RAN) UE throughput, according to some embodiments.
Figure 3:
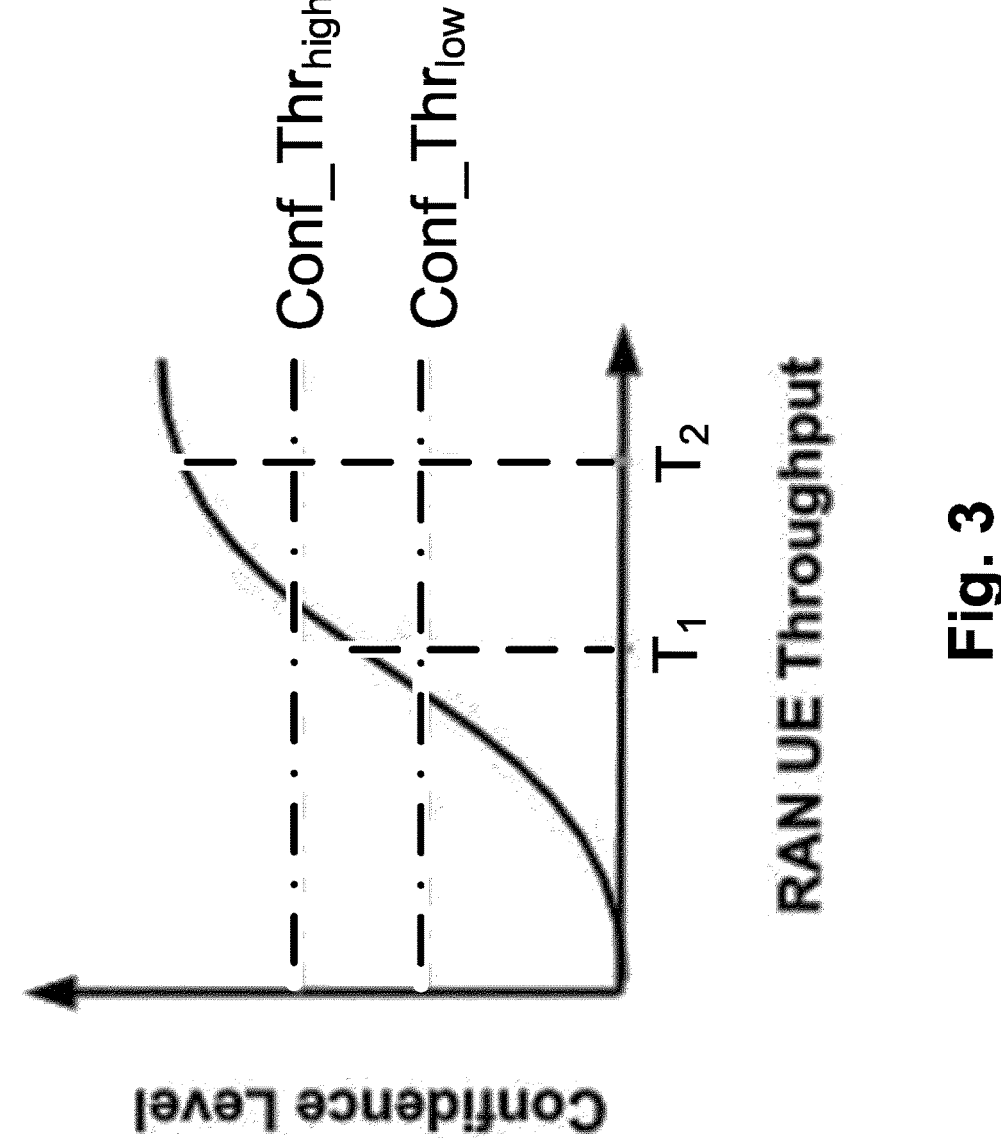
FIG. 3 illustrates another example of configuring a confidence threshold for a lower bound reporting threshold for RAN UE throughput, according to some embodiments.
Figure 3:

FIG. 2 illustrates an example 200 of configuring a lower bound confidence threshold (e.g., where the confidence may need to be equal to or higher than the confidence threshold to satisfy the confidence threshold) for a higher reporting threshold, and FIG. 3 illustrates an example 300 of configuring a lower bound confidence threshold for a lower reporting threshold, according to some embodiments. In the examples of FIGS. 2 and 3, both of the higher and lower reporting thresholds may be lower bound thresholds (e.g., where a value for reporting may need to be equal to or higher than the reporting threshold to satisfy the reporting threshold). The higher and lower reporting thresholds above may be differentiated by the lower reporting threshold having a lower value than the higher threshold. A higher bound threshold may include a threshold where a value needs to be equal to or lower than the threshold to satisfy the threshold. With respect to a RAN UE throughput metric, there may be scenarios that include, e.g., two reporting thresholds, T1 and T2 (where T1 is less than T2). These thresholds may be defined in the QoS sustainability analytics request or subscription, as illustrated in the examples of FIGS. 2 and 3. For the NWDAF consumer (e.g., AGV), the higher the throughput, the better the QoS may be and vice-versa. Accordingly, T1 may be the critical threshold (e.g., below T1 may have a negative impact for an AGV and, if triggered, the AGV may switch to a safe mode) while T2 may be the non-critical threshold (e.g., above T1 and below T2 may be tolerable for an AGV and, if triggered, the AGV may switch to the adapted mode of operation). Therefore, for T2, a confidence threshold for a higher reporting threshold ($Conf\_Thr_{high}$) can be configured while for T1, a confidence threshold for a lower reporting threshold ($Conf\_Thr_{low}$) can be configured, because for T2 false positive detections may have to be minimized while the detection rate of T1 may have to be maximized.

The examples of FIGS. 2 and 3 are described in the context of RAN UE throughput. For throughput, more may generally be better, so the provided reporting thresholds may be lower bound reporting thresholds. As explained above, there may be two lower bounds for the reporting threshold, a higher and a lower threshold, each having their own associated confidence threshold. However, this may depend on the metric that the reporting threshold is for, and in other cases the reporting threshold may be either a lower or an upper bound threshold, or a range within which the metric may be expected to remain.

As indicated above, FIGS. 2 and 3 are provided as examples. Other examples are possible, according to some embodiments.

Figure 4:
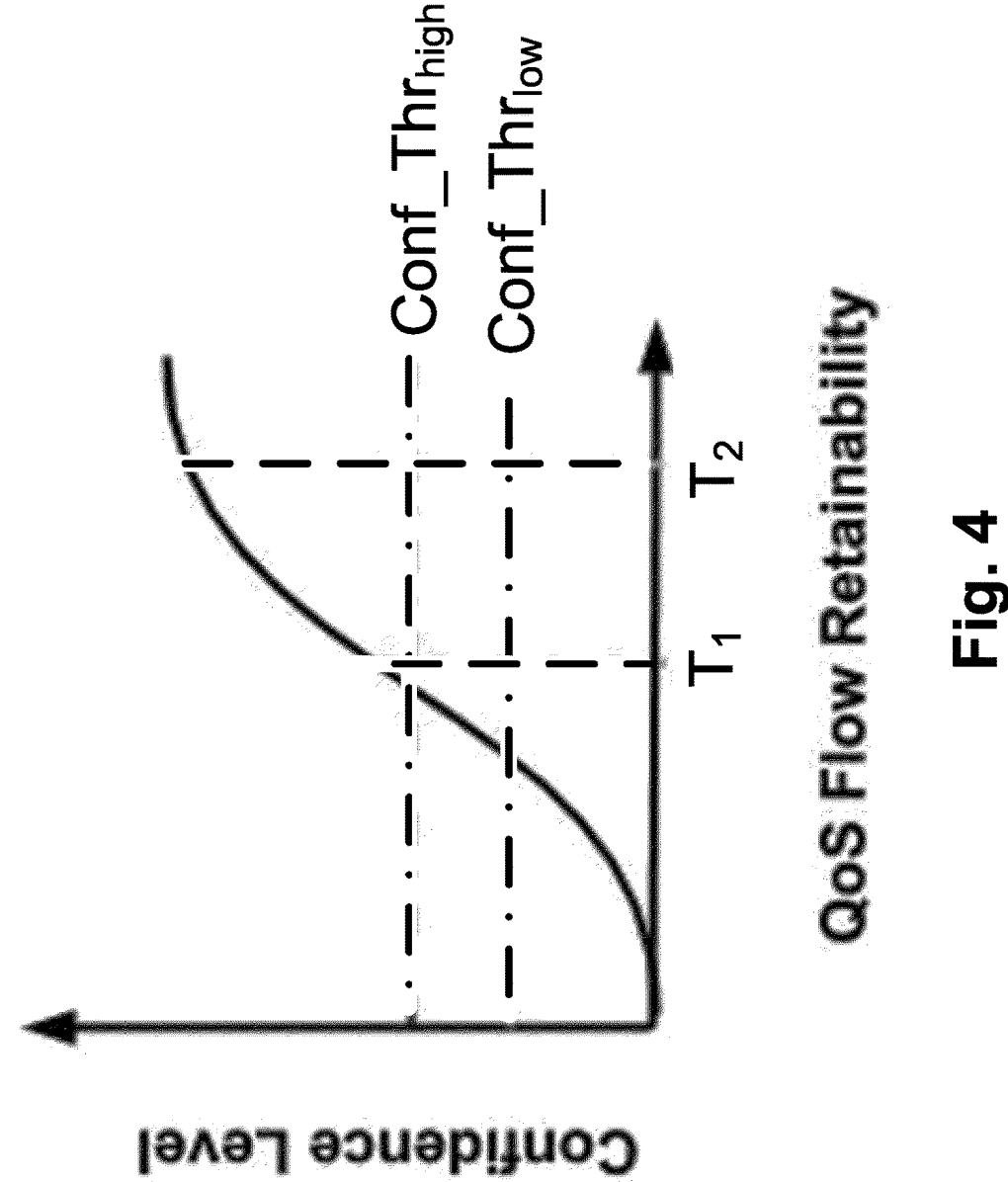
FIG. 4 illustrates an example of configuring a confidence threshold for a higher bound reporting threshold for quality of service (QoS) flow retainability, according to some embodiments.
Figure 5:
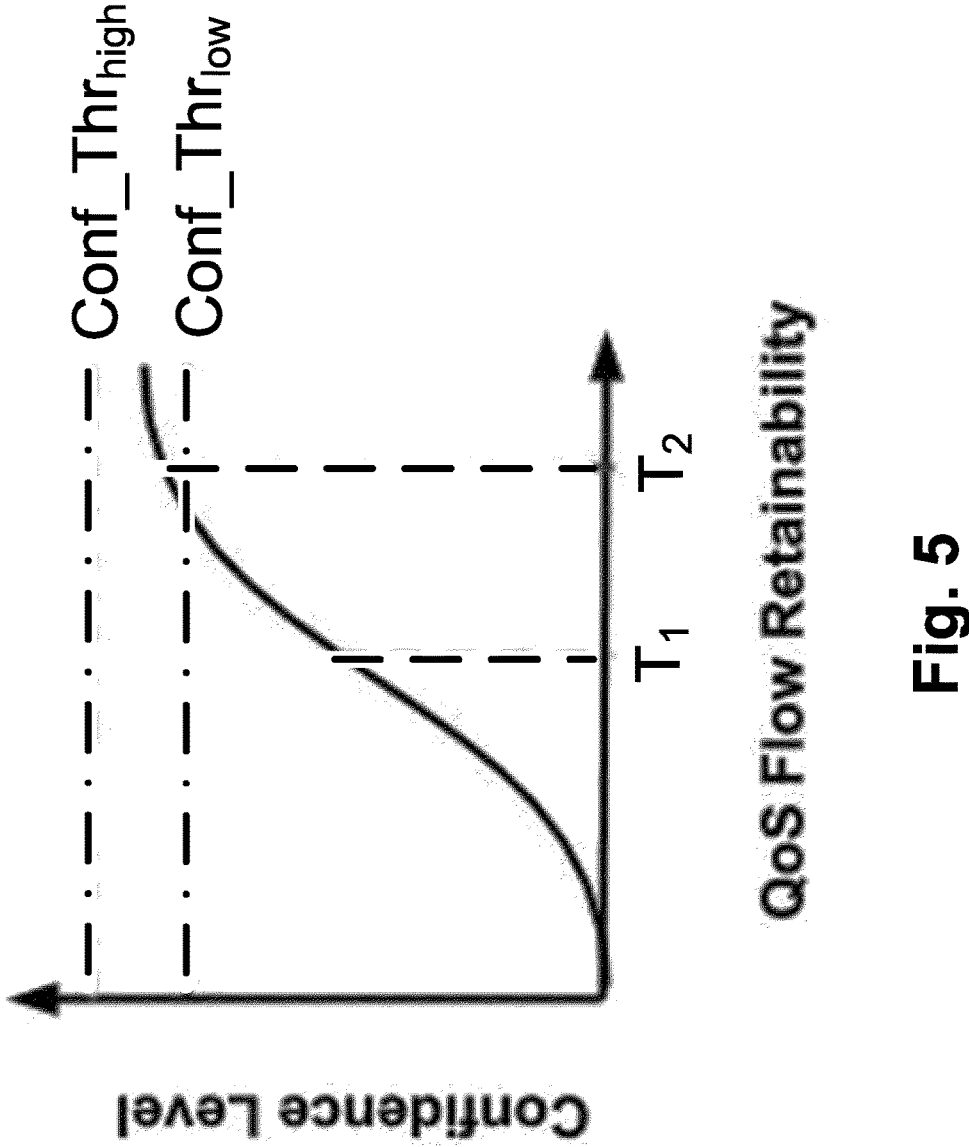
FIG. 5 illustrates another example of configuring a confidence threshold for a higher bound reporting threshold for QoS flow retainability, according to some embodiments.

FIG. 4 illustrates an example 400 of configuring a lower bound confidence threshold for a lower reporting threshold, and FIG. 5 illustrates an example 500 of configuring a lower bound confidence threshold for a higher reporting threshold, according to some embodiments. In this example, for QoS retainability, a lower metric value may be better (because it may indicate that fewer failures in the QoS retainability are occurring). Thus, for QoS retainability, the provided reporting thresholds may be upper bound reporting thresholds. In the examples 400 and 500, there are two upper bound reporting thresholds, a higher and a lower upper bound reporting threshold, each having their own associated confidence thresholds. In these examples, higher or lower bound thresholds, and higher or lower thresholds for a bounded threshold, may be similar to that described above. With respect to a QoS flow retainability metric, there may be scenarios with, e.g., two reporting thresholds, T1 and T2 (where T1 is less than T2). T1 and T2 may be defined in the QoS sustainability analytics request or subscription, as illustrated in the examples of FIGS. 4 and 5. For the NWDAF consumer (e.g., AGV), the lower the chances of abnormally losing a QoS flow during the time the QoS flow is active, the better the QoS may be and vice-versa. Accordingly, T1 may be the non-critical threshold (e.g., above T1 and below T2 may be tolerable for an AGV and, if triggered, the AGV may switch to an adapted mode of operation) while T2 may be the critical threshold (e.g., above T2 may be harmful for an AGV and, if triggered, the AGV may switch to a safe mode). Therefore, for T1, a confidence threshold for a higher reporting threshold can be configured while for T2, a confidence threshold for a lower reporting threshold can be configured because the false positive detections of T1 may have to be minimized while the detection rate of T2 may have to be maximized.

As described above, FIGS. 4 and 5 are provided as examples. Other examples are possible, according to some embodiments.

In certain embodiments, the confidence value given in the QoS sustainability notification may also be associated with a specific exceeded QoS metric threshold, e.g., given per threshold. Although certain embodiments have been described in connection with RAN UE throughput and QoS flow retainability QoS metrics, certain embodiments described herein may be applicable to any QoS metrics (e.g., latency, reliability, etc.). Certain embodiments may also apply to other analytics services, in addition to the QoS sustainability analytics.

Figure 6:
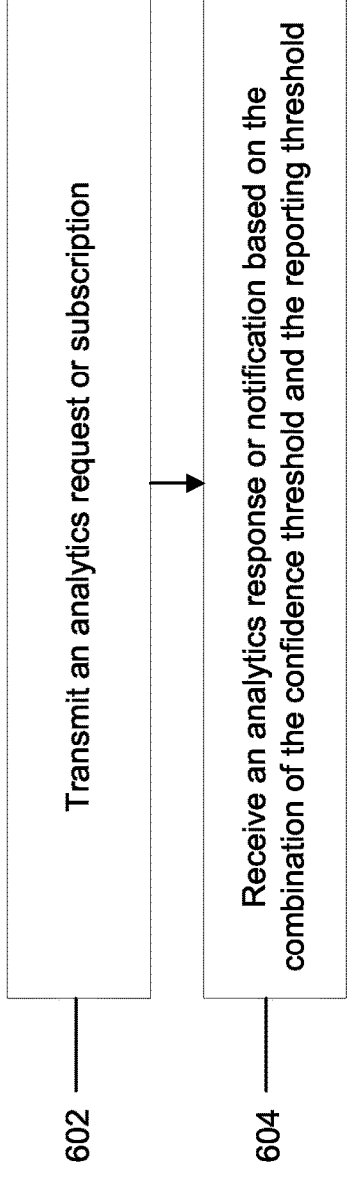
FIG. 6 illustrates an example flow diagram of a method, according to some embodiments.

FIG. 6 illustrates an example flow diagram of a method 600, according to some embodiments. For example, FIG. 6 may illustrate example operations of a analytics consumer (e.g., that includes, or is hosted on, apparatus 10 illustrated in, and described with respect to, FIG. 8a or apparatus 20 illustrated in, and described with respect to, FIG. 8b). Some of the operations illustrated in FIG. 6 may be similar to some operations shown in, and described with respect to, FIGS. 1-5.

In an embodiment, the method 600 may include, at 602, transmitting an analytics request or subscription, e.g., in a manner similar to that at 102 of FIG. 1. The analytics request or subscription may include one or more confidence thresholds corresponding to one or more reporting thresholds. A combination of a confidence threshold and a reporting threshold may define a condition for a prediction analytics event or a notification. The method 600 may include, at 604, receiving an analytics response or notification based on the combination of the confidence threshold and the reporting threshold, e.g., in a manner similar to that at 108 of FIG. 1.

The method 600 illustrated in FIG. 6 may include one or more additional aspects described below or elsewhere herein. In some embodiments, the analytics request or subscription may include a quality of service sustainability analytics request or subscription. In some embodiments, the quality of service sustainability analytics request or subscription may be associated with radio access network user equipment throughput-based analytics for non-guaranteed bitrate quality of service flows or with quality of service flow retainability-based analytics for guaranteed bitrate quality of service flows.

In some embodiments, the confidence threshold may include a lower bound confidence threshold and the reporting threshold may include a higher bound reporting threshold. In some embodiments, the confidence threshold may include a lower bound confidence threshold and the reporting threshold may include a lower bound reporting threshold. In some embodiments, the confidence threshold may include a lower bound confidence threshold and the reporting threshold may include a range within which one or more metrics are expected to remain.

As described above, FIG. 6 is provided as an example. Other examples are possible according to some embodiments.

Figure 7:
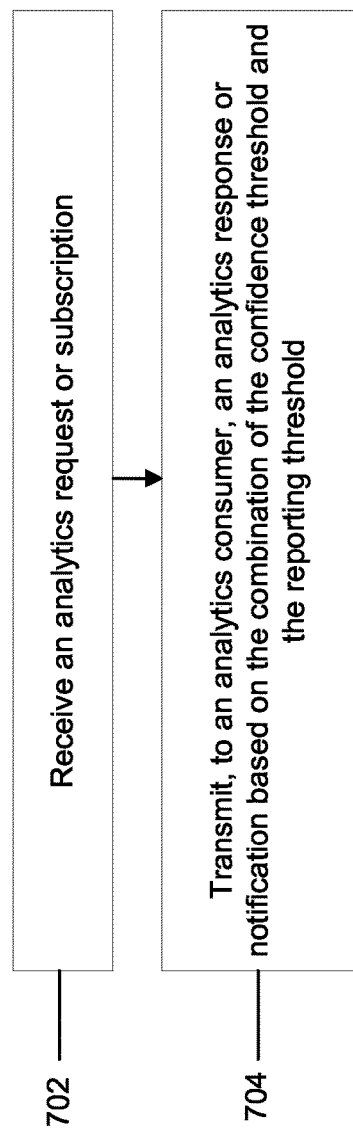
FIG. 7 illustrates an example flow diagram of a method, according to some embodiments.

FIG. 7 illustrates an example flow diagram of a method 700, according to some embodiments. For example, FIG. 7 may illustrate example operations of a NWDAF (e.g., that includes, or is hosted on apparatus 10 illustrated in, and described with respect to, FIG. 8a). Some of the operations illustrated in FIG. 7 may be similar to some operations shown in, and described with respect to, FIGS. 1-5.

In an embodiment, the method 700 may include, at 702, receiving an analytics request or subscription, e.g., in a manner similar to that at 102 of FIG. 1. The analytics request or subscription may include one or more confidence thresholds corresponding to one or more reporting thresholds. A combination of a confidence threshold and a reporting threshold may define a condition for a prediction analytics event or a notification. The method 700 may include, at 704, transmitting, to an analytics consumer, an analytics response or notification based on the combination of the confidence threshold and the reporting threshold, e.g., in a manner similar to that at 108 of FIG. 1.

The method 700 illustrated in FIG. 7 may include one or more additional aspects described below or elsewhere herein. In some embodiments, the analytics request or subscription may include a quality of service sustainability analytics request or subscription. In some embodiments, the quality of service sustainability analytics request or subscription may be associated with radio access network user equipment throughput-based analytics for non-guaranteed bitrate quality of service flows or with quality of service flow retainability-based analytics for guaranteed bitrate quality of service flows.

In some embodiments, the confidence threshold may include a lower bound confidence threshold and the reporting threshold may include a higher bound reporting threshold. In some embodiments, the confidence threshold may include a lower bound confidence threshold and the reporting threshold may include a lower bound reporting threshold. In some embodiments, the confidence threshold may include a lower bound confidence threshold and the reporting threshold may include a range within which one or more metrics are expected to remain.

As described above, FIG. 7 is provided as an example. Other examples are possible according to some embodiments.

Figures 8A, 8B:
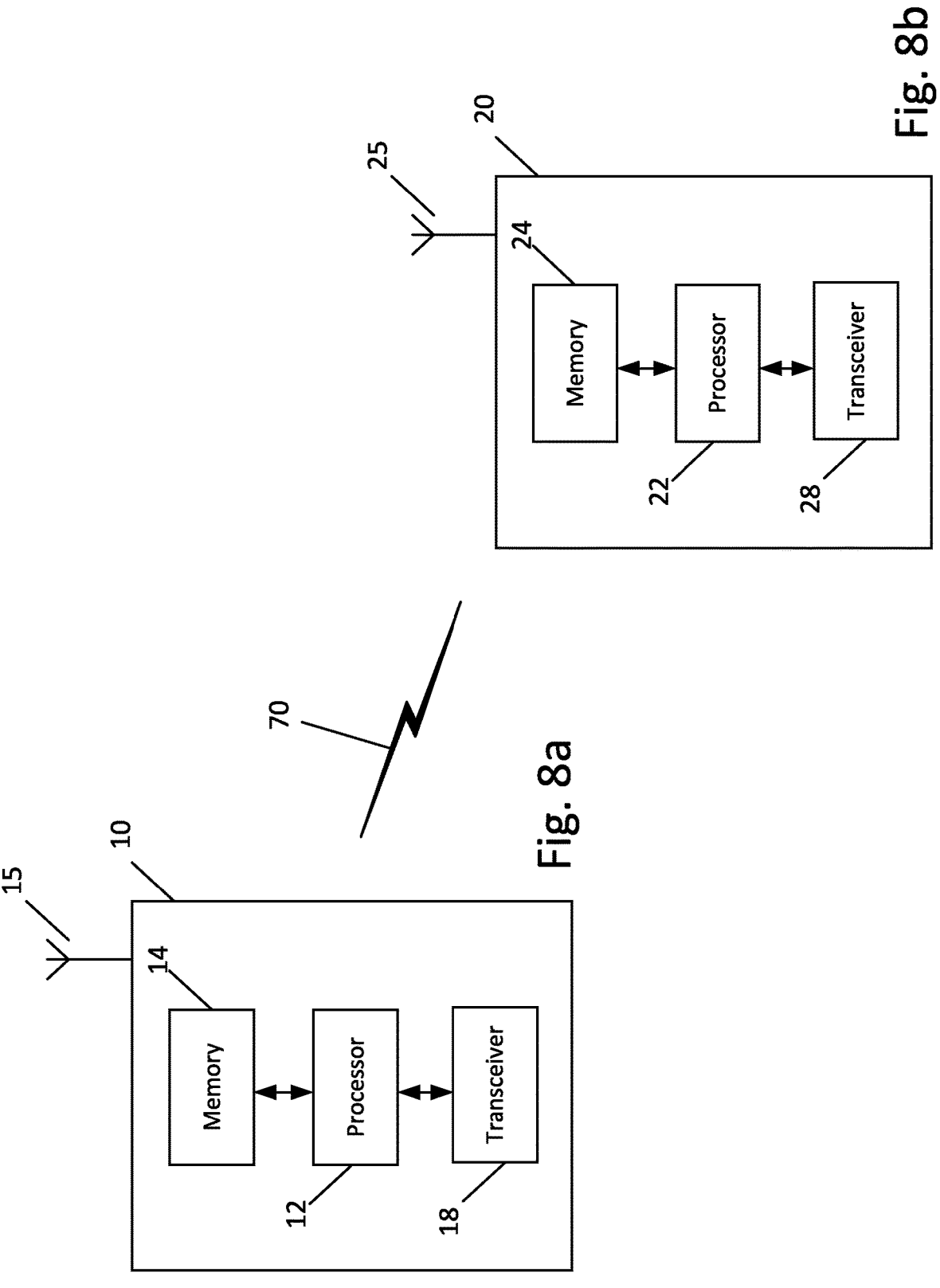
FIG. 8a illustrates an example block diagram of an apparatus, according to an embodiment.
FIG. 8b illustrates an example block diagram of an apparatus, according to another embodiment.

FIG. 8a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G. In some embodiments, apparatus 10 may include, or may host, an OAM function, a NWDAF, an analytics consumer, and/or the like.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8a.

As illustrated in the example of FIG. 8a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-7. For instance, apparatus 10 may be controlled by memory 14 and processor 12 to perform the methods of FIGS. 6 and 7.

FIG. 8b illustrates an example of an apparatus 20 according to another embodiment. In an embodiment, apparatus 20 may be a node or element in a communications network or associated with such a network, such as an analytics consumer, UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8b.

As illustrated in the example of FIG. 8b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-6. For instance, in one embodiment, apparatus 20 may be controlled by memory 24 and processor 22 to perform the method of FIG. 6.

In some embodiments, an apparatus (e.g., apparatus 10 and/or apparatus 20) may include means for performing a method or any of the variants discussed herein, e.g., a method described with reference to FIG. 6 or 7. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is improve prediction behavior and notification criteria through use of a confidence threshold in connection with a reporting threshold. Another example benefit of some example embodiments is conservation of processing resources that would otherwise be consumed performing behaviors or providing notifications that would not otherwise satisfy a confidence threshold. Accordingly, the use of some example embodiments results in improved functioning of communications networks and their nodes and, therefore constitute an improvement at least to the technological field of requesting or providing analytics reporting or notifications, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single NWDAF equally applies to embodiments that include multiple instances of the NWDAFs, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

AF Application Function
AGV Autonomous Guided Vehicle

US 12,621,231 B2

15

GBR Guaranteed Bitrate
KPI Key Performance Indicator
NWDAF Network Data Analytics Function
OAM Operations, Administration and Management
QoS Quality of Service
SLAM Simultaneous Localization and Mapping
TAI Tracking Area Identifier

We claim:

1. An apparatus, comprising:

at least one processor; and at least one memory including computer program code, wherein the at least one memory and the computer program code are configured to, with the at least one processor, cause the apparatus at least to:

transmit an analytics request and transmit a subscription, wherein the analytics request and the subscription each comprises:

respective confidence thresholds corresponding to respective reporting thresholds, wherein a respective combination of the respective confidence thresholds and the respective reporting thresholds define a respective condition for a prediction analytics event or a notification;

receive an analytics response based on the respective combination of the respective confidence thresholds and the respective reporting thresholds for the analytics request; and receive a notification based on the respective combination of the respective confidence thresholds and the respective reporting thresholds for the subscription, wherein the analytics request comprises a quality of service sustainability analytics request, wherein the subscription comprises a quality of service sustainability subscription, wherein the quality of service sustainability analytics request is associated with quality of service flow retainability analytics for guaranteed bitrate quality of service flows, wherein the quality of service sustainability subscription is associated with radio access network user equipment throughput-based analytics for non-guaranteed bitrate quality of service flows, wherein the confidence thresholds comprises a lower bound confidence threshold, and wherein the reporting thresholds comprise:

a higher-bound reporting threshold, and a lower-bound reporting threshold.

* * * * *